United States Patent
Naeckel et al.

(10) Patent No.: US 12,063,976 B2
(45) Date of Patent: Aug. 20, 2024

(54) TAMPER PROOF VAPING DEVICE, SYSTEM, AND METHODS

(71) Applicants: Arno Tedford Naeckel, Scottsdale, AZ (US); David Thayne Martin, Chandler, AZ (US); Phillip Hickman, Las Vegas, NV (US)

(72) Inventors: Arno Tedford Naeckel, Scottsdale, AZ (US); David Thayne Martin, Chandler, AZ (US); Phillip Hickman, Las Vegas, NV (US)

(*) Notice: Subject to any disclaimer, the term of this patent is extended or adjusted under 35 U.S.C. 154(b) by 391 days.

(21) Appl. No.: 17/130,368

(22) Filed: Dec. 22, 2020

(65) Prior Publication Data

US 2021/0212379 A1    Jul. 15, 2021

Related U.S. Application Data

(60) Provisional application No. 62/971,059, filed on Feb. 6, 2020, provisional application No. 62/959,047, filed on Jan. 9, 2020.

(51) Int. Cl.
| | | |
|---|---|---|
| *A24F 47/00* | (2020.01) | |
| *A24F 40/51* | (2020.01) | |
| *A24F 40/53* | (2020.01) | |
| *A24F 40/57* | (2020.01) | |
| *A24F 40/60* | (2020.01) | |
| *A24F 40/65* | (2020.01) | |
| *A24F 40/90* | (2020.01) | |
| *G06K 7/10* | (2006.01) | |
| *G06K 19/077* | (2006.01) | |

(52) U.S. Cl.
CPC ............ *A24F 40/53* (2020.01); *A24F 40/51* (2020.01); *A24F 40/57* (2020.01); *A24F 40/60* (2020.01); *A24F 40/65* (2020.01); *A24F 40/90* (2020.01); *G06K 7/10366* (2013.01); *G06K 19/07758* (2013.01)

(58) Field of Classification Search
CPC .......... A24F 40/50; A24F 40/53; A24F 40/65
See application file for complete search history.

(56) References Cited

U.S. PATENT DOCUMENTS

| | | | |
|---|---|---|---|
| 2014/0253144 A1* | 9/2014 | Novak, III | A24F 40/50 324/550 |
| 2016/0211693 A1 | 7/2016 | Stevens | |
| 2018/0192702 A1* | 7/2018 | Li | H05B 1/0277 |
| 2018/0263283 A1 | 9/2018 | Popplewell | |

(Continued)

*Primary Examiner* — Eric Yaary
(74) *Attorney, Agent, or Firm* — Arno Naeckel (57) ABSTRACT

Systems for tamper proofing vapor device e-liquid tanks are provided. The systems comprise tanks with one or more irremovable Radio Frequency Identification tags (RFID) tags. The tanks are used in conjunction with vaping devices that are equipped with a wireless RFID scanner and a processor. The tank may include a memory device with authentication data and a partial wired circuit segment connected thereto. The vape device may also include a wired a circuit segment connected to the processor and a battery. The two wired circuit segments are connected together physically and electrically to form a complete circuit when the tank makes physical contact with the vape device. The connection allows the processor to periodically read the memory device to ensure the tank is not replaced with an adulterated tank after the RFID tag(s) enable the heating element.

10 Claims, 5 Drawing Sheets

(56) References Cited

U.S. PATENT DOCUMENTS

| | | | |
|---|---|---|---|
| 2019/0272359 A1* | 9/2019 | Popplewell | G06F 21/32 |
| 2021/0007404 A1* | 1/2021 | Lee | A24F 40/53 |
| 2021/0007413 A1* | 1/2021 | Moloney | A61M 11/042 |
| 2021/0022404 A1* | 1/2021 | Moloney | A24F 40/53 |
| 2021/0022407 A1* | 1/2021 | Moloney | H04B 1/38 |
| 2021/0315256 A1* | 10/2021 | Plattner | A24B 15/12 |

* cited by examiner

TAMPER PROOF VAPING DEVICE, SYSTEM, AND METHODS

RELATED PRIORITY APPLICATION

This utility application claims priority from U.S. Provisional Application 62/959,047 filed on Jan. 9, 2020 and from U.S. Provisional Application 62/971,059 filed on Feb. 6, 2020, each of which are incorporated herein by reference in their entireties.

BACKGROUND

Consumers utilize electronic vapor cigarettes, pipes, and modified vapor devices to enjoy what is commonly known as "vaping." Vaping is an increasingly popular market segment, which has been, and continues to, steadily gain market acceptance over the last several years until adulterated/counterfeit product began causing deadly lung ailments do to the illegitimate use of vitamin E acetate, THC and other additives.

Various types of personal vaporizers are known in the art. In general, such vaporizers are characterized by heating a solid to a smoldering point, vaporizing a liquid by heat, or nebulizing/aerosolizing a liquid by heat and/or by expansion through a nozzle. Such devices are designed to release aromatic materials or CBD in the solid or liquid forms (aka, "E-liquid" or "E-juice") while avoiding high temperatures of combustion and the associated formation of tars, carbon monoxide, or other harmful byproducts. Exemplary, non-limiting examples of a vaping device are described in EP 2399636 to Thorens, U.S. patent applications Ser. Nos. 15/907,249 and 16/125,593 to Martin, U.S. patent publications 2018/0098574 and 2018/0070645 to Sur and Monsees, respectively, and U.S. Pat. Nos. 10,362,805; 10,039,321; and 9,980,514 to Johnson, Verleur, and Malamud, respectively, each and all of which are included herein by reference in their entireties.

European Patent Application EP 2399636 ("Thorens") discloses a vaping system comprising an aerosol generator and a liquid storage portion where additional electronics are capable of discerning one type liquid storage device from another in order to adjust the power profile delivered to a heating device. The additional electronics may also prevent the aerosol generator from operating when no liquid storage portion is attached as a power saving and a safety feature (¶0122). These additional electronics include mention of a generic RFID system and/or additional resistors built into the liquid storage portion for identification purposes.

One disadvantage of such a proposed vaping device is that the described RFID system is generic and apparently can have a detection range that is measured in feet or yards. Hence, any and all RFID chip/transponders on any number of liquid storage devices in a large area will be detected simultaneously. There is no ability to discern or read just the storage device to be inserted. As such, the RFID feature as described renders the Thorens device unfit for its intended purpose. A second disadvantage is that it is expensive, relative to a conventional liquid storage device, to add resistors (804, 904,905, 906 and 907). As a third disadvantage, there is no contemplation or a suggestion on a means to update processor 309. As such, the devices of FIGS. 10-11 will come obsolete with changes in the market. And lastly, for the reasons discussed above, merely combining the Thorens RFID subsystem with identification resistors would not solve the RFID infirmities, resulting from the conflated identifications.

E-liquid is a water based liquid infused with nicotine or flavor ingredients and can also include up to 95% vegetable glycerin or propylene glycol. Other e-liquids may include health supplements such as vitamin B-12. Standards for e-liquids have been established by the American E-liquid Manufacturing Standards Association (AEMSA).

The components of a prior art personal vaporizer may include a mouthpiece, a tank to hold the material to be vaporized, a heating element, a battery, a manually operated switch to close an electrical circuit to the heating element, and possibly one or more light-emitting-diodes (LED) indicating the status of the vaporizer. In some cases a replaceable tank or liquid storage portion is all that is interchangeable.

An atomizer comprises a small heating element, or coil, that vaporizes E-liquid, and may include a wicking material that draws the liquid into the coil. When the user pushes a button or otherwise activates a pressure sensor by inhaling, the heating element energizes and atomizes the E-liquid. The E-liquid reaches a temperature of roughly 100-250° C. within a chamber to create an aerosolized vapor. In some instances, a combined atomizer and cartridge called a "Cartomizer" or a "Clearomizer" may be used which heats up the material to be vaporized and creates the vapor to be inhaled. Many vape devices are designed to be opened and refilled from an outside liquid supply (See, e.g. U.S. Pat. Nos. 10,362,805 and 10,039,321). These types of open devices have proven to be an attractive nuisance to users of all ages because it is easy to add adulterating substances. Further, it has been noted that bad actors have drilled through sealed or closed devices to tamper with the contents.

During the year 2019, a significant health crisis developed concerning lung disease in those who vape black market or adulterated e-juice. The primary culprit was the addition or use of Vitamin E Acetate in the e-juice. However, other adulterating substances such as THC are also of concern for a variety of dangerous health reasons. Presently there is no systems or methods to prevent the use of counterfeit or adulterated vaping products, either self-contained juice pods or refillable devices. Hence, there is a need for systems and methods to safely vape by foreclosing the possibility of using adulterated or counterfeited vape cartridges with a vaping device.

BRIEF SUMMARY

The subject matter herein relates to the operation of vaping devices and the tamper proofing systems therewith. More particularly, the subject matter relates to tamper proofing of E-liquid pods, cartridges, or tanks used to service vapor devices. The subject matter disclosed herein also may be modified by a skilled artisan to operate on solids as well as liquids.

The systems, devices and methods herein comprise tanks/cartomizers with one or more irremovable transceivers or RFID tags, including antennas. The tanks are used in conjunction with separate battery packs that are equipped with at least a wireless RFID scanner and a processor. The processor enables the heating element (that is comprised in all vaping devices) only when the scanner receives information transmitted by the RFID tag(s) that confirms that the physical cartridge is a bonafide product from an authorized source. The RFID tag(s) also verify that the cartridge seals have not been penetrated or otherwise compromised. Removing or damaging an RFID label (RFIDL) destroys the transmission ability of the RFID chip comprised in the label. The RFID labels may be either passive or active (i.e., powered). Product identification only labels are known herein as Product Identification Labels (PRFIDL). As non-limiting examples the RFID labels may utilize ISO 15693 and ISO 14443A[2] air interface protocols and use ISO 15693 RFID tags.

The tank or cartridge may include a memory device with authentication/informational data recorded thereon and a partial wired circuit segment connected thereto. The vapor generating device (i.e. battery pack) may also include a counterpart partially wired circuit segment that is connected to the processor and a battery. The partial circuit is complimentary to the partial circuit incorporated in the cartridge. The two partial circuit segments are connected together physically and electrically to form a complete circuit when the tank/cartridge makes physical contact with the vape device through a connection device. The connection allows the processor to periodically or constantly read the memory device, or determine an electrical characteristic (e.g., current, voltage, an impedance or a resistance), to ensure a validated cartridge is not replaced with an adulterated cartridge after the RFID tag(s) have initially enable the heating element.

According to aspects of the subject matter disclosed herein are systems and methods to not only identify one product storage device from another without the cumbersome addition of additional electronic networks, but to prevent the vapor producing device from energizing the product storage device's heating element unless at least two conditions are fulfilled simultaneously. The first general condition is that a valid RFID transponder with unique identifying information that is irremovably attached to the product storage device is detected within a very small distance from the vapor producing device. The second general condition is that when a product storage device is seated in the vapor producing device, an expected electronic characteristic is or is not generated in a specified electronic component internal to the vapor producing device. Failure to detect all of the conditions, or to detect all of the conditions in a specific time sequence or interval, would prevent the vapor producing device to operate.

DETAILED DESCRIPTION

The following detailed description is merely exemplary in nature and is not intended to limit the invention, or the application, or uses of the subject matter disclosed. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Vaping systems and apparatus are discussed herein that ensure only approved, unadulterated vaping cartridges may be consumed. It should be understood that for the purposes of understanding the orientation of individual elements or components of the invention, the terms "front" and "front side" shall generally be used to indicate a surface or surface of an element or component that when assembled in a protective case or apparatus, is orientated toward the primary side of the device. Conversely, for the purposes of understanding the orientation of individual elements or components of the invention, the terms "back" and "back side" shall generally be used to indicate a surface or a surface of an element or component that when assembled in a protective case apparatus is orientated away from (i.e. faces away from) the primary side of the device.

It should also be understood that the terms "right" and "left" are used solely to denote opposite sides of an element, component, or surface in the same manner that "top" and "bottom" are used solely to denote opposite sides of an element, component, or surface and should not unnecessarily be construed as limiting the position or orientation of said element, component, or surface.

In the following description, for purposes of explanation, numerous specific details are set forth in order to provide a thorough understanding of the present invention. It will be evident, however, to one skilled in the art that the present invention may be practiced without these specific details.

Those of skill in the art will appreciate that any illustrative logical blocks, modules, circuits, and algorithm steps described in connection with the embodiments disclosed herein may be implemented as electronic hardware, computer software, or combinations of both. Some of the embodiments and implementations are described herein in terms of functional and/or logical block components (or modules) and various processing steps. However, it should be appreciated that such block components (or modules) may be realized by any number of hardware and/or software components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, analog-to-digital converters, logic elements, look-up tables, or the like, which may carry out a variety of functions under the control of one or more microprocessors or other control devices. Those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module or other information may reside in RAM memory, flash memory, ROM memory, EPROM memory, EEPROM memory, registers, hard disk, a removable disk, a CD-ROM, or any other form of digital storage medium known in the art. An exemplary storage medium is coupled to the processor such the processor can read information from, and write information to, the storage medium. In the alternative, the storage medium may be integral to the processor. The processor and the storage medium may reside in an Application Specific Integrated Chip (ASIC).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements unless expressly state otherwise. For example, two elements may be connected to each other physically, electronically, logically, or in any other manner, through one or more additional elements.

The concepts herein are directed to apparatus, systems and methods to restrict the ability to use unapproved or adulterated vape liquid products with a particular make and model of a vaping device or prevent it absolutely. The concepts described herein apply to any replacement vape juice cartridge or tank. Concepts presented herein do not apply to vaping devices with tanks that are purposefully designed to be opened and refilled. However, ancillary sub-systems such as a puff counter may be included to limit how many times a heater in a refillable cartridge can be used.

Figure 2:
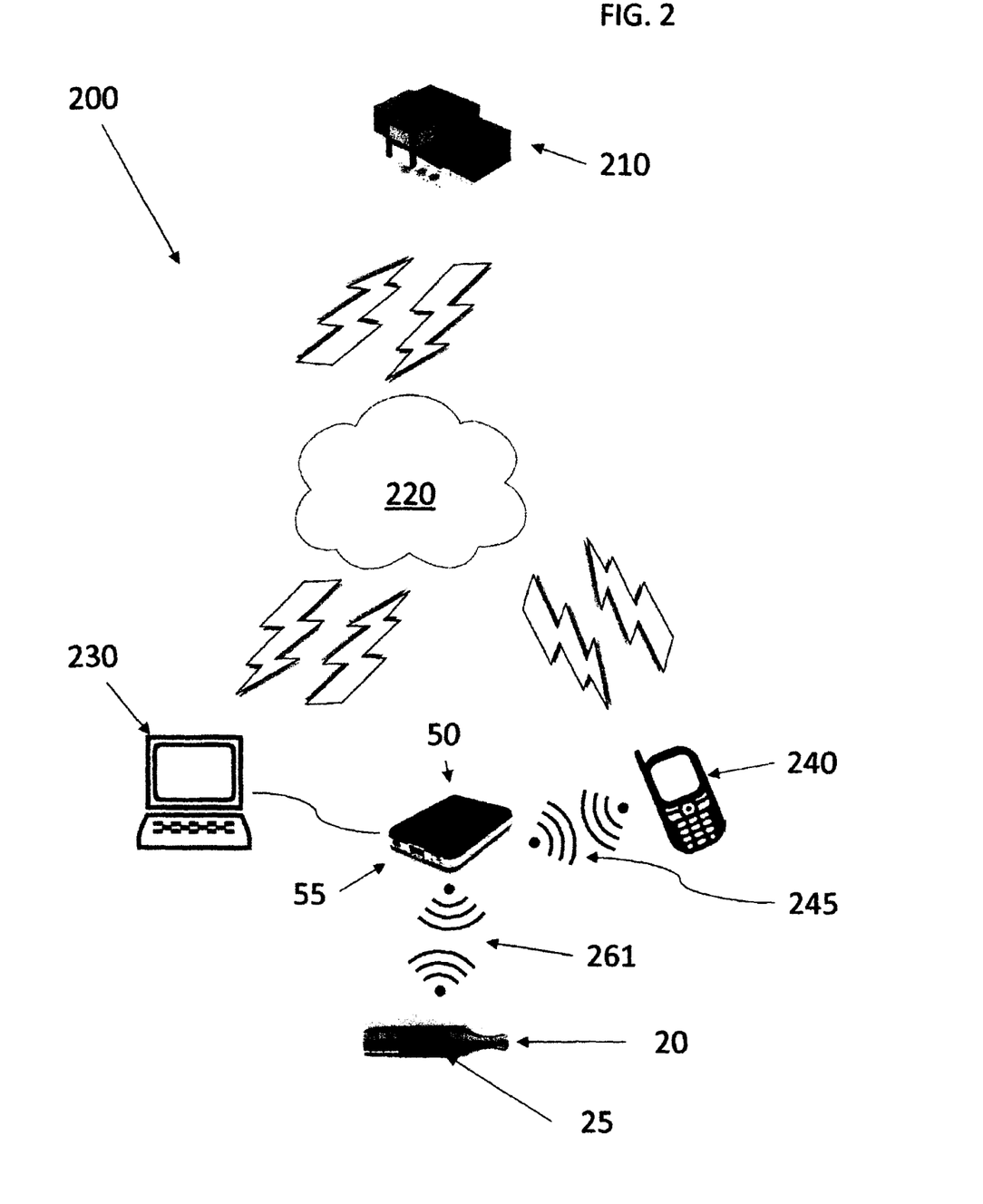
FIG. 2 is a functional block diagram of system within a vaping device that prevents or greatly complicates the use of adulterated vape liquids/juice.

The general concept includes identification of a cartridge using internet 220, Bluetooth 245, and/or Radio Frequency (RFID) communication 261 (See, FIG. 2). Very short range wireless, optical (e.g., bar code), "on contact" wired, or "near field" electromagnetic circuitry may also be used in place of, or in conjunction with, RFID communications. The RFID communication, or lack thereof, can prevent the operation of the vaping device when unapproved or possibly adulterated replacement cartridges are mated to a vaping device.

The term "very short range" is defined herein to be a maximum effective range of less than or equal to 3 inches and includes wireless, zero range or "on contact," or inductive/capacitive "near field" connection solutions. The term "effective range" means the range in which an electronic signal from the vaping device, or from a form factor incorporating the vaping device, may be received by a passive RFID transceiver chip or other wireless electronic device with sufficient power to cause a return a signal to the transmitter/transceiver, or to a separate receiver, that is just strong enough to be reliably processed by the transceiver or receiver. Effective range for "on contact" or inductive/capacitive solutions may be essentially zero. In some alternative embodiments, the effective range may be less than 40 inches and more preferably less than 20 inches. In other alternative embodiment maximum effective range is preferably less than 2 inches (5 cm). In still more embodiments, the maximum effective range may be adjustable to better suite one mode of operation over another, such as authentication as opposed to vape energization.

The wireless signal may be of any wireless IEEE protocol known in the art. However, it is preferable that any IEEE 802 protocol that currently exists or may be developed in the future be used. UHF or HF radio frequency systems and protocols are alternatives in some equivalent embodiments. As a non-limiting example of a suitable operating frequency is 13.56 MHz +/−7 KHz.

The concepts herein will be discussed in the realm of wireless communications. A Class 4 Bluetooth system may be used, which has a nominal range of less than about 20 inches. Shorter possible ranges are considered better for the purposes of this application, which can be attained by adjusting the antenna gain of the RFID system, reducing signal power by software or hardware means, or applying shielding such as Mylar. UHF or HF wireless protocols, near field, and direct connect communications means are also contemplated here as alternatives in equivalent embodiments and can have an effective range of less than approximately 3 inches. Similar adjustments may be made to UHF and HF systems.

The RFID subsystem may be a conventional RFID system using any conventional RFID technology known in the art or that may be developed in the future. This RFID discussion is non-limiting in that it is not meant to exclude direct connect, laser, infrared or other optical equivalents, or audio equivalents. A exemplary scanner/antenna system may be the Thingmagic® M1 Mini HF RFID transceiver using an Scalable Link Interface (SLI-s) that is available from JADAK Engineering on a SL2S2602 ICODE SLIX2 integrated circuit.

Figure 1:
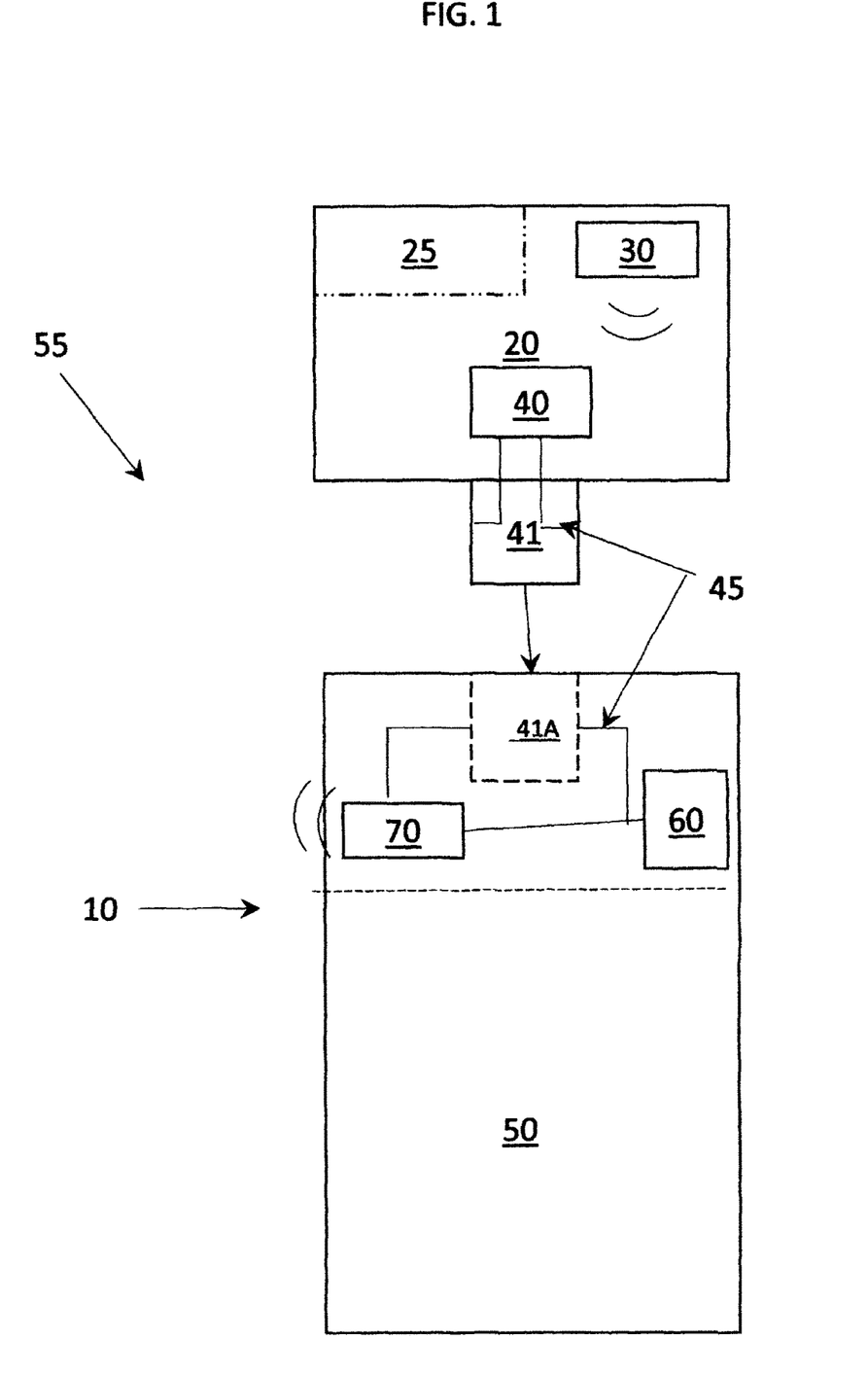
FIG. 1 is a general diagram of a distributed system for deterring the counterfeiting and tampering with a vape cartomizer/cartridge/atomizer/clearomizer.

FIG. 1 is an overall diagram of the operational system. The system comprises a vaping device battery pack 10 and an e-juice tank/cartridge(s) 20, or a replaceable liquid storage portion 25. Each e-juice cartridge 20 may include an embedded, or irremovably adhered, RFID circuit 30, an impedance, and a memory device 40 containing product identification information (informational data) that may include a security code that may be unique to the cartridge or product. In fact, any cryptologic system known in the art may be used. As non-limiting examples Symmetric Key Cryptography such as block and stream cyphers, hash functions, and Message Authentication codes may be used. Public-Key or public Private Key methods may also be used. And time-varying, or calendar based codes are also non-limiting examples of information security systems that may be used.

The RFID chip 30 may be comprised in a tamper proof seal/label of the e-juice tank 25 or cartridge 20. An exemplary non-limiting example of such a tamper proof label system useable herein is described in U.S. Pat. No. 7,410,103 to Nagel, which is herein incorporated by reference in its entirety. The RFID product label or tamper label 30 is wirelessly read by a scanner 70, incorporated in the battery pack or a casing thereof.

Non-limiting examples of RFID circuits that may be useful include but are not limited to the high-frequency (HF) tag to from Murata Manufacturing Co. The Murata tag measures 3.2 millimeters (0.13 inch) in width and length and 0.7 millimeter (0.03 inch) in thickness—about one-tenth the size of most other HF tags. Murata's version is designed to be both durable and small, with a ceramic substrate enclosing a layered circuit board and an antenna.

Another non-limiting exemplary RFID circuit is the passive ultrahigh-frequency (UHF) RFID EPC Gen 2 tag from Hitachi Chemical, measuring just 2.5 millimeters (0.098 inch) square and 0.3 millimeter (0.012 inch) thick. It consists of an Impinj Monza 5 chip and an antenna embedded in epoxy resin, the Ultra-Small Package tag is designed to be durable enough that it could be applied via injection molding or incorporated into printed circuit boards. This means the tag could be built into a circuit board or a semiconductor's packaging and sustain the temperatures typically used during manufacturing processes—as high as 260 degrees Celsius, or 500 degrees Fahrenheit.

The E-liquid tank 25 or cartridge 20, also may include an open circuit 45 including a memory device 40 having the unique security code recorded thereon. The memory device 40 may or may not be incorporated in, or connected into the RFID circuit/system. The open circuit 45 is connected to its counterpart in the battery pack 10 when the E-liquid tank or cartridge 20 is both physically and electrically connected into the vaping device battery pack 10. This may be accomplished by including multiple electrical contacts or terminals in the connection mechanism 41/41A for the cartridge 20. A non-limiting example of such a connection or connecting device is mentioned in U.S. Pat. No. 9,980,514 to Malamud.

By inserting the cartridge/tank 20 into the connection device 41A, a battery 50 powering a processor 60 co-located therewith is connected and provides power to the memory 40 in the cartridge 20. The processor 60 reads and monitors the impedance or the unique code on the memory 40 until the cartridge 20 is removed. The processor 60 contains support logic to manage the data received from the RFID chip 30 and from the memory 40, and also may drive the operation of the incorporated RFID scanner 70. It may also allow the scanner to shut down while the cartridge is attached. In such equivalent embodiments, scanner 70 may be connected in parallel with processor 60 and may be controlled by an additional isolation switch (not shown) such that the processor and heater 85 may continue to operate while scanner 70 be deenergized to preserve battery charge. Once the cartridge 20 is removed, the scanner would be re-energized and become operational.

In an alternative arrangement, resistor (R2) may be included the partial circuit 45 in the battery pack 10. In some cases the effective resistance ($R_{eff}$) of the cartridge 20 may be considered R1. Memory 40 and resistors (R1/R3) are mutually exclusive features but may be used together independently and my together be included in the effective resistance of the cartridge or product container (20).

In this arrangement, when the two partial circuits 45 are joined at the connection device 41/41a, a voltage would be detected across the resistor R2 of resistor network R2/R3 by the processor 60 via an ammeter, or voltmeter/voltage detecting circuit (not shown). At that point the scanner may be shut down. A timer (not shown) may also be included for additional security and operational flexibility. By knowing the value of R1, R3, or $R_{eff}$, and the voltage of battery 50, the operational voltage across, or current through, R2 (an operational parameter) may be determined and compared to an expected value recorded in RFID label 30 and/or the processor 60. If the resistance, or voltage across, or current through, R2 is the expected characteristic value, that matching may be used by processor 60 to energize and enable heating element 85. Switch 80 may be configured to thereafter remain shut as long as there is a voltage detected across resistance R2 and to open as soon as cartridge 20 is removed and the voltage or current vanishes.

Figure 3:
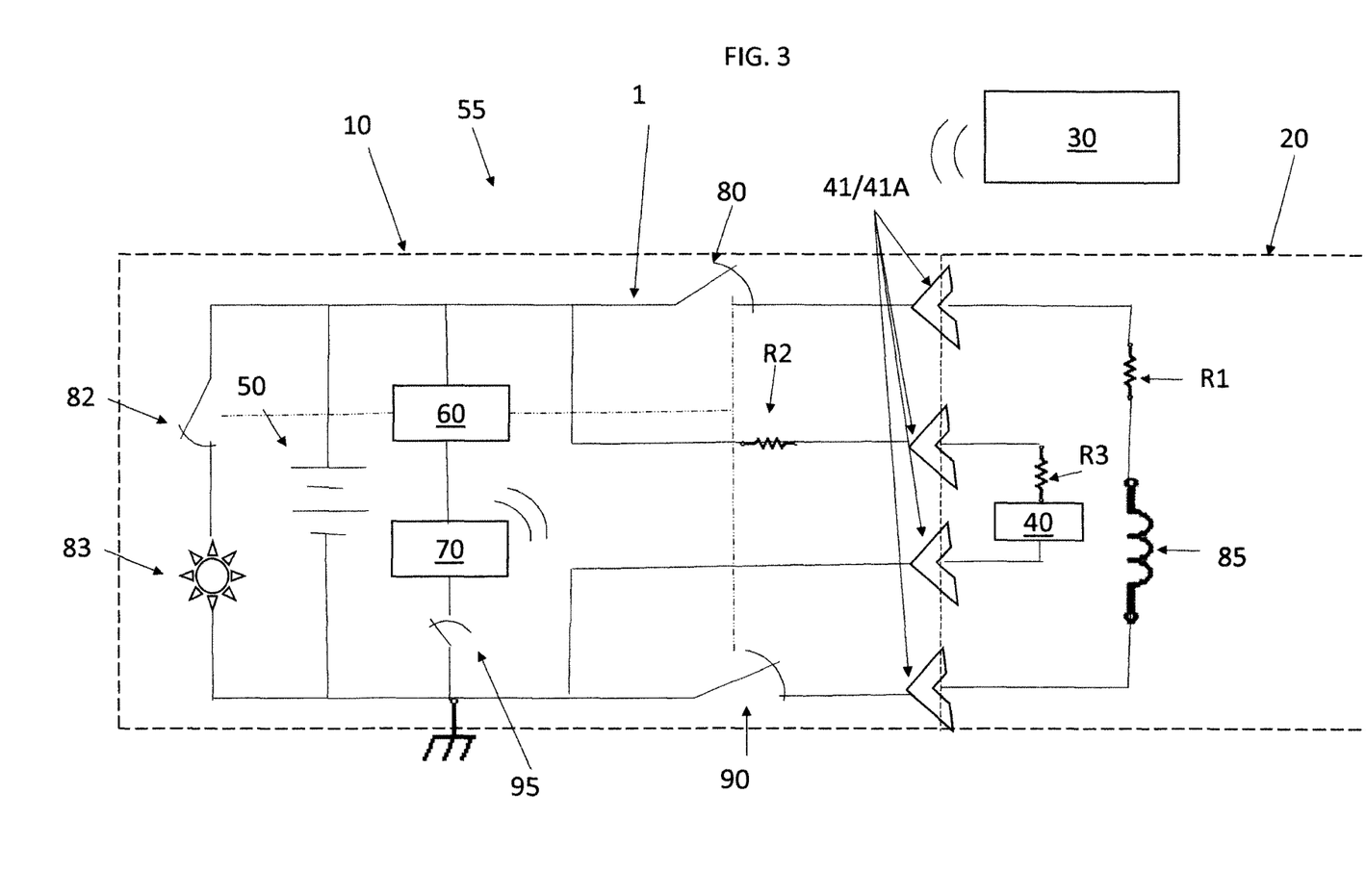
FIG. 3 is an exemplary, non-limiting circuit diagram for a tamper proof vaping device.

The tamper system also operates by preventing the heating element 85 (that is comprised in all vaping devices) from energizing (See FIG. 3). This is accomplished by electronically opening a normally closed switch 80 connecting the battery 50 to the cartridge or by keeping a normally open switch 80 to the heating coil 85 open when vaping is not permitted by the tamper system. The switch 80 may be any electronic switch known in the art. A non-limiting example of a suitable switch is a transistor such as a field effect transistor (FET).

The logic in processor 60 that controls the switch 80 utilizes a positive detection from the RFID tag 30. The RFID tag 30 may be irremovably attached to the cartridge 20. Preferably it is placed over any access in the cartridge that may be used to extract or add to the contents of the cartridge 20 to seal the access. The RFID tag 30 may be placed on the cartridge 20 or embedded in the cartridge so that any attempt to tamper with the contents interrupts or breaks the RFID tag 30 circuit, or antenna, thereby preventing it from responding to a query from the scanner 70.

The memory device 40 includes data that identifies the cartridge 20 as being an "authorized cartridge." Once seated in the battery pack 10 via connection device 41/41A, electrical contacts/terminals 45 in the connecting device for the battery pack mate or contact their counterpart open circuit leads 45 to the memory device 40 in the cartridge 20 allowing the processor 60 to query the memory device 40. If the processor 60 cannot detect the expected data recorded in the memory 40, the switch 80 energizing the heating element of the cartridge opens or remains open thereby disabling the vape device. The RFID tag 30 that has been permanently attached to the atomizer/cartomizer/clearomizer 20 may be programmed with the same coding as that in the memory device or different code the sophistication of which may include any cryptology methods currently known or that may be developed in the future.

It is contemplated in some embodiments that an intact, properly operating RFID label 30 verifies that the product contained in the cartridge 20 is unadulterated until the circuit in the RFID label is broken and disabled by seating the cartridge 20 into the battery pack 10, or until an attempt to remove the RFID label 30 breaks the circuit or antenna of the tag. The RFID Label 30 and the battery pack 10 may be configured so that the RFID label 30 may be broken by the vaping device 10 concurrently with, or after, the open circuit 45 is closed by seating contact with the battery pack 10. At that point data read from the memory device 40 allows the processor 60 to maintain the electronic switch 80 closed, or close it, and permit vaping. When the used cartridge 20 is removed, the switch 80 is again opened because a RFID label has been disrupted during the insertion and/or the memory device is no longer in communication thereby opening switch 80. Again, this is due to the lack of the detection of a valid and unadulterated cartridge 20. It should be noted that the exact operational mechanism here may have different variations depending on the number of RFID labels used as PRFIDs or TRFIDs. The programming of the processor may then be adjusted to control the switch 80

Sequencing of events may be made central to the operation of the systems described herein depending on the construction, make, or model of the battery pack 10 and cartridges 20. For example, when a cartridge 20 with a tamper RFID label 30 is detected at a maximum range (e.g., 3 inches), the processor 60 can then determine if the cartridge is a recognized and valid cartridge manufactured by a legitimate source from the product RFID label response signal. It may also determine if one or more RFID labels are intact and reporting. If all expected labels do not report, the heating element 85 of the cartridge may remain disabled by the processor 60.

If all RFID labels are reporting with expected data, then the open circuit 45 may be closed when the cartridge 20 is beginning to be seated (i.e. makes contact) in the receptacle 41A of the connection device in the vaping device. Once the open circuit 45 to the memory 40 is closed by contact in the connection device 41/41A and the memory 40 is energized, the cartridge 20 may be fully seated in receptacle 41A, where the tamper RFID label may pierced/broken to allow the contents to flow or the vape device to fully operate. In this example, all RFID labels are reporting and circuit 45 is completed thereby allowing processor 60 to close switch 80 or to keep it closed. At this point, a TRFIDL may then (i.e., a moment later) be destroyed such that it no longer effects the position of the electronic switch 80. It should be noted that different designs of the vaping device may require a rearrangement (or an abridgement) of the sequence of events and components without departing from the scope of the disclosure herein.

FIG. 2 illustrates an exemplary control and communication system 200 that may be used in conjunction with vaping device 55 described above. Manufacturers and distributors of e-juices 210 (or similar vaping materials) have a vested interest in fighting counterfeit products and the adulteration of their legitimate product. To support and improve this effort using RFID and other systems discussed above in regard to FIG. 1, the coding in the memory 40 and RFID tags 30 that is also recorded in the processor 60 or in a memory associated therewith may be dynamically managed.

The processor 60 may include an incorporated or external memory for storing a look-up table, the look-up table comprising data representing one or more electrical characteristics of one or more electrical components comprised in the cartridge 20, each characteristic associated with data identifying a liquid storage portion 25. The processor may further comprise a means for searching the look-up table. The processor may further comprise a means for determining a type of liquid storage portion by searching the look-up table for data identifying the type of liquid storage portion associated with data representing an electrical characteristic of the electronic component which matches data representing the determined characteristic of the electrical component.

For example, as new batches or "lots" of vaping product are manufactured or distributed to retail outlets, unique security identification date validating the product cartridges 20 is encoded on the irremovably attached RFID tags/labels 30. When a retail customer recharges the battery 50 in his vaping device 55 by attaching it to a USB port of his computer 230, the processor 60 may notify a server (not shown) via the internet 220 at the manufacturer/distributor 210 over the internet. The server at computer manufacturer/distributor 210 may then download the security/product data for any newly manufactured lots/batches to the processor 60 that then may be used by the battery pack 10 to authenticate new cartridges 20. Similarly, the security data of outdated product cartridges may be flagged as expired such that the vaping device 10 does not operate with the expired product cartridge 20. Further, product usage data may be uploaded to the manufacturer/distributor 210 to be used for analysis or future micro-advertising. This communication may or may not use a manufacturer specific user application. Similarly, such communication mat be accomplished by omitting the computer 230 where the processor 60 may upload/download its information directly to the Internet via a Wifi or other wireless communication via a cell phone or a router.

Data from the server of the manufacture/distributor 210 may be pushed to, or pulled by, the retail user cellphone 240 over the cellular/internet 220 and then communicated to the battery pack processor 60 via wired or Bluetooth communications 45, which is currently used in some smartphones. In some embodiments near field electromagnetic signaling may be used, which is also standard in some smartphones and computer tablets.

Similarly, downloaded data may be used by the vaping device 55 to authenticate cartridges being purchased. To do this, an indicator light 83 (See, FIG. 3) may be installed in the user's vapor device battery pack 10. At the point of purchase, or when received by mail, a retail buyer may hold new cartridges within range of the scanner 70 in the vaping device that will cause the processor 60 to energize the indicator light to light thereby authenticating the cartridges without insertion into the battery pack 10.

The same data on the RFID labels may be used by Customs and Border Patrol to detect counterfeit merchandise at ports of entry. It may also be used by the United States Post Office or other shippers to help detect counterfeit cartridges. This use may require the usage of an additional RFID label(s) on the shipping box(es).

FIG. 3 is a non-limiting, exemplary circuit 1 diagram supporting a tamper proof vaping device 55. The exemplary circuit 1 is divided into two physical portions that are electrically connected during use by connecting portion 41/41A. And wirelessly connected via RFID subsystem 30/70. Within battery pack 10, processor 60 and the RFID scanner 70 are powered by the battery 50 when manually operated switch 95 is shut.

FIG. 1 is intended to functionally illustrate an example of circuit 1. Those of ordinary skill in the art will recognize that functionally equivalent circuits may be constructed with other components in other electronic configurations both electrical and physical without departing from the scope and spirit of this disclosure. switches disclosed herein are exemplary and may be referred to, or designed as a switch fabric.

Manually operated on/off switch 95 closes a circuit loop to energize the scanner 70, processor 60, and possibly an indicator light 83 when so equipped. By keeping switch 95 normally open the system does not drain the battery over time. The on/off switch 95 may be any kind of switch known in the art and may include a mechanical toggle switch, or an electronic switch manipulated through a touch screen icon or a biometric input. Indictor light 83 may be connected to switch 82 that is controlled by processor 60 so that when a valid cartridge 20 is within range of scanner 70 the light 83 is energized by battery 50.

Switch 90 is a normally open switch that connects one terminal of the heating device 85 to one end of the battery 50 when closed. Switch 90 may be a physically manipulated switch or a switch operated by a "puff control" circuit as is known in the art. Switch 90 may also tandemly or synchronously control switch 95, 83 and/or 80 via processor 60 as part of a switch fabric.

Switch 80 is a normally open electronic switch that is operated by control signals from processor/controller 60. Processor/controller 60 receives data from the RFID scanner 70, which in turn operates the switch 80. In some equivalent embodiments the processor/controller 60 and the RFID scanner 70 may be physically and/or electronically consolidated onto a single substrate or be integrated into a single component. Switch 80 closes or remains closed to energize heating element 85. It should be noted that switch 80 may be configured to remain shut once cartridge 20 is physically and electronically attached to the battery pack 10. Vaping may then be controlled by switch 90 connected to puff control mechanism.

The circuit 1, may also comprise a switch 82 connected in series or parallel with an indicator light 83 and the battery 50. The switch 82 may be operable simultaneously with switch 80 such that when switch 80 closes in response to an RFID signal the switch 82 also closes, allowing the indicator light 83 to light. As an exemplary arrangement herein, the indicator light 83 energizes when the RFID scanner 70 receives a recognized RF signal from an RFID label 30.

As such, the battery pack 10 can be used to detect authorized cartridges 20 while still in their packages or at least before they are inserted into the connection device 41/41A.

Replaceable cartridge 20 (or alternatively tank 25) comprises the second half of the circuit 1 that includes the memory 40 and heating element 85 that vaporizes the vaping substance (solid or liquid). Additional circuit components may be included as is known in the art to add additional functionality or to effect a more operationally efficient configuration of the circuit. For example the resistance R1 or R3 may be used to prevent the heating element 85 from acting as a short circuit or to protect the optional memory 40 from an overvoltage/overcurrent situation or partial circuit 45 from being a short circuit if optional memory 40 is absent as may be known in the art.

Figure 4A:
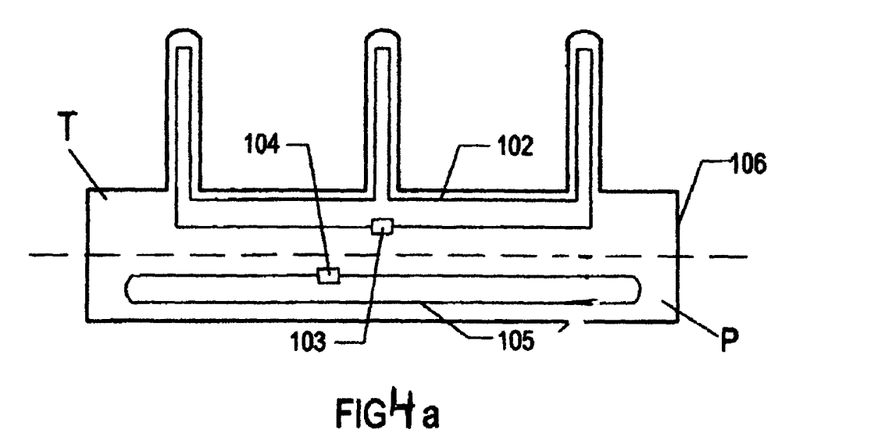
FIG. 4A is a view of the electronic component layout of an exemplary, non-limiting TRFIDL/PRFIDL depicting a single sheet comprising both a product label and a corresponding tamper label.
Figure 4B:
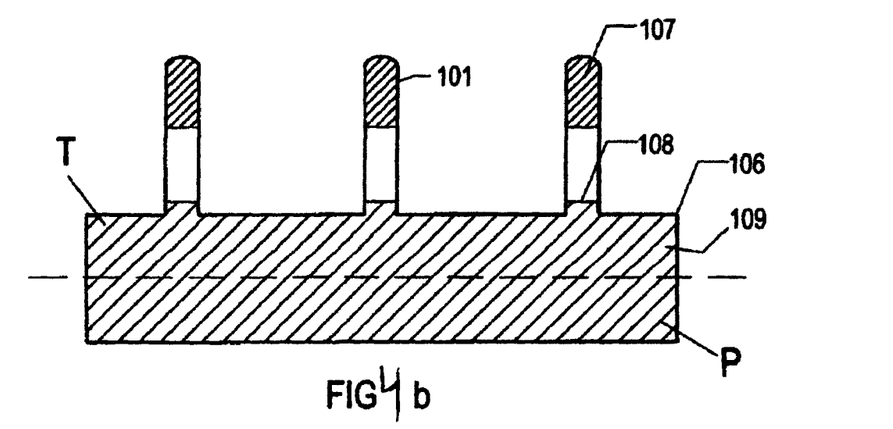
FIG. 4B is a view of the mechanical component layout of the exemplary TRFIDL/PRFIDL.
Figure 4C:
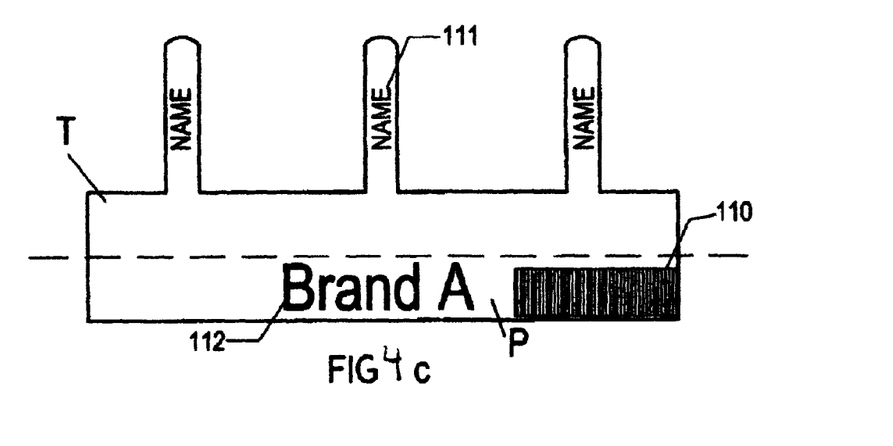
FIG. 4C is a depiction of the exemplary RFID label as it may appear to an adult vaper.
Figure 5A:
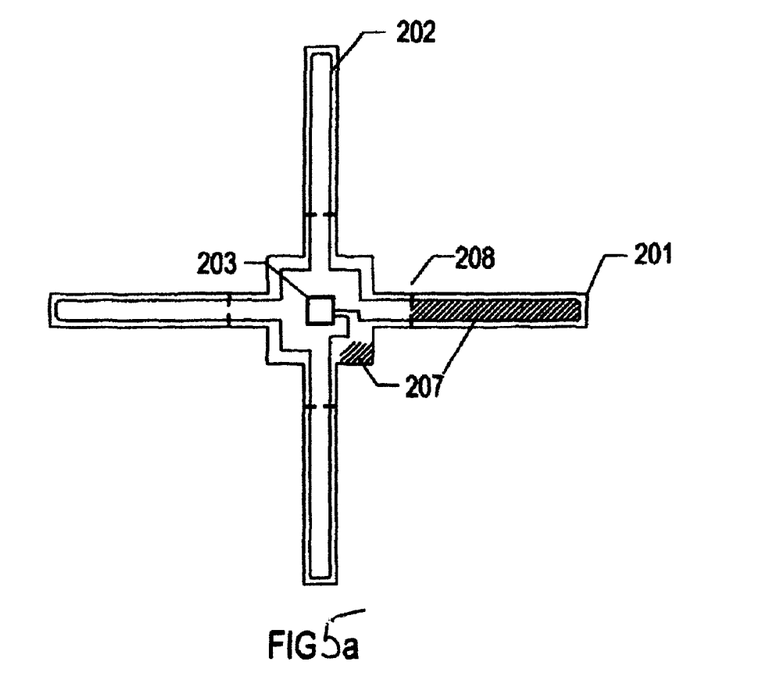
FIG. 5A is a layout of another non-limiting example of a tamper RFID label.
Figure 5B:
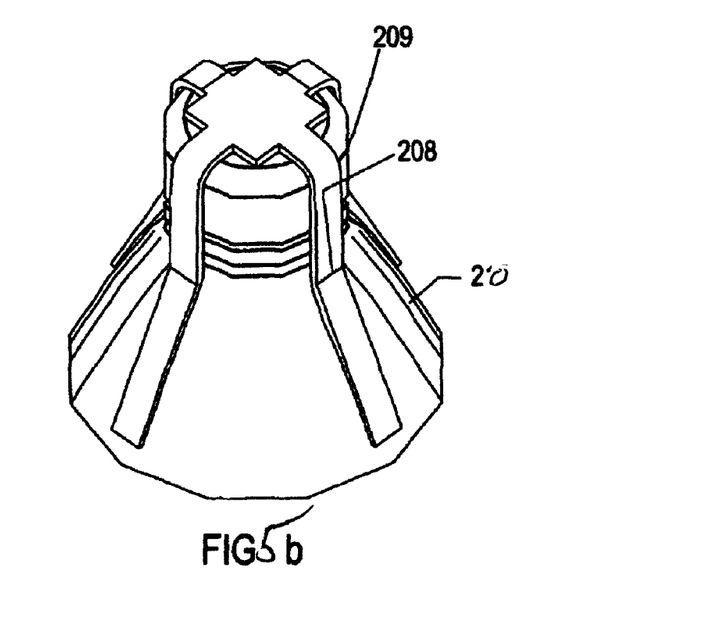
FIG. 5B is an exemplary view of the embodiment of a tamper RFID label as applied to a vape cartridge opening.

RFID tag 30 may be a single Product ID Label (PRFIDL) or may be a single PRFIDL and one or more Tamper ID Label(s) (TRFIDL) (See FIGS. 4 and 5). This allows for both product verification and tamper detection. Multiple RFID components may be embedded in one or multiple RFID labels. TRFIDL's may be utilized to seal the accesses and thereby secure the vaping product in the cartridge 20 or seal the product packaging. In some equivalent embodiments, a single RFID label may wrap around the entire tank or liquid storage component and include a circuit and/or antenna that is physically configured to interfere with a penetration into the liquid storage component by piercing or drilling. Such piercing would break a component of the RFID circuit comprised in the label (e.g., the antenna) to prevent transmission by the label. The TRFIDL may be constructed out of a clear or a translucent material so that an adult vaper may evaluate the amount of e-juice contents of the cartridge 20 or tank 25. The RFID label may be comprised of a clear or translucent substrate such that the product or product level may be visible therethrough.

Each RFID chip embedded in each of the FRID labels may have a unique encryption recorded thereon that may be associated with encryptions on the other associated RFID components affixed to the product package by their tamper labels. Failure of a scanner to detect all of the expected associated encryptions in all the RFID labels on a given cartridge 20/tank 25 may result in a tamper warning generated by software executing in the scanning device or an associated computer processor.

Another exemplary embodiment of the present invention may be viewed as a tamper prevention system that includes two electronic components and their associated destructible conducting paths that are permanently embedded in two separate labels, a "product" label and a "tamper" label. Each electronic component may be an RFID component and may contain an electronic encryption that is associated with the encryption on the other electronic component wherein both encryptions may be read by a scanner. The product label may be attached to a surface of a product or an access to the e-liquid, such as a screw top or a fill/drain penetration. A tamper label may be attached across each access to the product or may be embedded in the product packaging in such a fashion as to seal each access so that any attempt to tamper with the product would necessarily require the electronic component or antenna embedded in the tamper label or package to be degraded or destroyed.

When an untampered product is scanned, all electronic components transmit their encryptions. The receipt of all of the expected/valid encryptions by the scanner indicates that the product is a valid cartridge 20 and that the tamper labels 30 have not been degraded. When a cartridge with a disabled tamper label (TRFIDL) is scanned, the receipt of less than all of the encryptions embedded in the product labels may indicate to the scanner 70 that a valid product exists on the shelf but that a tamper label or product label has been degraded or that the product has expired such that the product should be removed from offer. When a cartridge 20 with a disabled product label (PRFIDL) is scanned, the receipt of only the encryption embedded in the product label may indicate to the scanner that the cartridge 20 is a counterfeit cartridge and that the heating element 85 not be enabled.

An embodiment of the present subject matter may be viewed as a method to detect product tampering that includes irremovably affixing a product RFID label ("PRFIDL") to a surface of a product package, wherein the PRFIDL integrally includes a first electronically readable encryption recorded on a first RFID component connected to a first destructible conducting path or antenna. Irremovably affixing one or more tamper RFID labels ("TRFIDL") to one or more accesses in the cartridge 20 or tank 25, wherein penetrating any of the one or more accesses disrupts an additional destructible conducting path electrically connected to an additional RFID component each of which are integrally attached to the one or more TRFIDLs, wherein further the additional RFID component contains an additional electronically readable encryption that is associated with the first electronically readable encryption. Reading from the PRFIDL and the one or more TRFIDLs the first electronically readable encryption and the additional electronically readable encryption(s). The first electronically readable encryption may be readable into a first database and the additional electronically readable encryption(s) into a second database. Data from the RFID labels may then be compared to a database in the processor 60, where the failure to receive an electronically readable encryption from the RFID labels that matches those in the database generates an error. And, storing the error in a data schema, generating an error report and opening or keeping open switch 80 disabling the heating element 85.

FIG. 4a is a non-limiting depiction of an exemplary TRFIDL (T)/PRFIDL(P) label 106. The depiction shows a single label with two independent RFID tags 130/104 and two independent conducting paths 102/105. The label 106 is irremovably attached or adhered to the vape cartridge 20 or tank 25. The attempted removal of the label 106 or the seating of the cartridge 20 in the connection device 41 will break one or both of the independent conducting paths 102/105 rendering the corresponding RFID incapable of transmitting.

FIG. 4b is a rendering of the underside of the TRFID/PRFID label 106 of FIG. 1a showing the tamper adhesive 107 and the product label adhesive 109. The diagram also shows a perforation 108 that would increase the susceptibility of the label to rip and disabling the conducting path 102.

FIG. 4c is a depiction of the front of the TRFIDL/PRFIDL of FIG. 1a that includes a product or brand name 111/112 and a bar code, which are optional.

FIG. 5a is an underside depiction of another non-limiting example of a TRFIDL showing four (4) tamper strips 201, the tamper adhesive 207, the RFID chip 203, conducting path 202 and perforation, or weakened area 208.

FIG. 5b is a depiction of the TRFIDL of FIG. 5a as it may be applied to an access point 209 of a vape cartridge 20. Inserting the access point into the battery pack 10 will perforate the label at 203 (destroying the RFID chip) or will rip the tamper strip(s) 201 and breaking the conducting path 202. Either disturbance will render the label unable to transmit.

What is claimed is:

1. A safe vapor generating system (55) configured to receive a product storage portion (20), the product storage portion having a heating element (85), an effective resistance ($R_{eff}$), and an RFID label (30) irremovably attached to the product storage portion (20), the RFID label containing a first set of data recorded therein identifying the product storage portion (20), the safe vapor generating system (55) comprising:
  a battery (50);
  a radio frequency detection means (70) configured with a maximum detection range that is less than 7.62 cm (3 in) from the safe vapor generating system (55) and that is configured to wirelessly receive the first set of data from the RFID label (30);
  an electronic device (R2) that is electrically connected to the product storage portion (20) and to the battery (50) that presents an electrical characteristic value when so connected;
  an electronic switch (80) connecting the battery (50) to the heating element (85) and
  a processing device (60) having a second set of data recorded therein, wherein the processing device (60) compares the first set of data received by the radio detection means (70) and the presented electrical characteristic to the second set of data, wherein the processing device (60) is configured to energize the heater (85) by closing the electronic switch (80) only when at least part of the first set of data and the electrical characteristic value concurrently match the second set of data.

2. The safe vapor generating system (SS) of claim 1, further comprising an indicator (83) connected to the battery (50), wherein the processing device (60) energizes the indicator (83) when at least part of the first set of data matches at least part of the second set of data.

3. The safe vapor generating system (55) of claim 1, wherein the radio frequency detection means (70) and the RFID label (30) communicate in the High Frequency (HF) radio band.

4. The safe vapor generating system (55) of claim 3, wherein the radio frequency detection means (70) and the RFID label (30) communicate at a frequency of 13.56 MHz +/−7 Khz.

5. The safe vapor generating system (55) according to claim 1 wherein the radio frequency detection means (70), the switch (80), and the processor (60) communicate via a serial communications protocol.

6. The safe vapor generating system (55) of claim 1 further comprising one of a Bluetooth transceiver and a wifi transceiver in operable communication with the processor (60).

7. The safe vapor generating system (55) of claim 1 further comprising a recharging port, wherein the processor (60) may communicate with a computing device via powered USB through the recharging port.

8. A method for validating a vaping product stored in a storage portion (20) that is used in conjunction with an vapor generating system (55), comprising:
  wirelessly receiving by a radio detection means (70) a first set of data from a RFID label (30) that is irremovably attached to the storage device (20), the radio detection means (70) having a maximum detection range that is less than 7.62 cm (3 in), and preferably less than 2.54 cm (1 in), from the safe aerosol generating system (55);
  by a processor (60), detecting a characteristic of a pre-identified electronic device ($R_2$) that is comprised in the vapor generating system (55), wherein the electronic device ($R_2$) presents the electrical characteristic only when it is electrically connected to both the storage portion (20) and to a battery (50);
  by the processor (60), determining that a second set of data matches both the first set of data and the electrical characteristic; and supplying power from the battery (50) to the storage portion (20) by the processor (60) based on the determining step.

9. The method of claim 8, further comprising: determining that a second set of data simultaneously matches only the first set of data; and supplying power from the battery (50) to an indicator (83) by the processor (60) based on the determining step.

10. The method of claim 8, wherein matching of the second set of data to both the first set of data and the electrical characteristic occurs during a predetermined time period after the first set of data is detected.

* * * * *